United States Patent
Fleury et al.

(12)
(10) Patent No.: US 6,505,968 B1
(45) Date of Patent: Jan. 14, 2003

(54) SYSTEM FOR ACTIVE STIFFNESS, POWER, AND VIBRATION CONTROL IN BEARINGS

(75) Inventors: Christian Fleury, Remaufens (CH); Pierre Descombaz, Chavannes (CH); Gunter K. Heine, Aptos, CA (US); Hans Leuthold, Santa Cruz, CA (US); Zine Eddine Boutaghou, Vadnais Heights, MN (US)

(73) Assignee: JPMorgan Chase Bank, New York, NY (US)

( * ) Notice: Subject to any disclaimer, the term of this patent is extended or adjusted under 35 U.S.C. 154(b) by 0 days.

(21) Appl. No.: 09/505,129

(22) Filed: Feb. 16, 2000

Related U.S. Application Data

(60) Provisional application No. 60/130,097, filed on Apr. 20, 1999.

(51) Int. Cl.[7] .............................................. F16C 32/06
(52) U.S. Cl. ........................ 384/1; 384/100; 384/114; 384/121
(58) Field of Search ................................ 384/100, 105, 384/107, 111, 112, 113, 114, 115, 118, 120, 121, 123, 1

(56) References Cited

U.S. PATENT DOCUMENTS

| | | |
|---|---|---|
| 4,850,719 A | 7/1989 | Moseley et al. |
| 5,051,005 A | 9/1991 | Duncan |
| 5,238,308 A * | 8/1993 | Lang et al. ..................... 384/1 |
| 5,322,369 A * | 6/1994 | Kataoka ........................ 384/1 |
| 5,397,183 A | 3/1995 | Lu et al. |
| 5,550,688 A | 8/1996 | Aoyagi et al. |
| 5,941,644 A * | 8/1999 | Takahashi .................... 384/112 |

FOREIGN PATENT DOCUMENTS

| | | | |
|---|---|---|---|
| GB | 2 265 949 | * | 10/1993 |
| JP | 62-237114 | * | 10/1987 |
| JP | 4-69404 | * | 3/1992 |

* cited by examiner

Primary Examiner—William C Joyce

(57) ABSTRACT

A bearing assembly having a shaft member having a bearing race and a piezoelectric member opposing the bearing race is situated so that when a voltage is applied to it, it expands against the bearing race so that a preload of the bearing is varied. The assembly includes a rotor having two outer bearing races opposing the shaft's inner bearing races. The contact angle for the upper bearing races is different than for the lower bearing races. In one embodiment of the present system, the piezoelectric member is disposed between the shaft member and the bearing race for varying the radial position of the bearing race. In another embodiment, the piezoelectric member is disposed for varying the axial position of the bearing race. In one embodiment, the system includes a hydrodynamic bearing assembly having a stator member having a hydrodynamic surface and a rotor member having a surface facing the stator member hydrodynamic surface. A piezoelectric member is attached to either the stator member or the rotor member for varying the width of said gap between said surfaces.

11 Claims, 9 Drawing Sheets

SYSTEM FOR ACTIVE STIFFNESS, POWER, AND VIBRATION CONTROL IN BEARINGS

RELATED APPLICATION

This application claims the benefit of U.S. Provisional Application Serial No. 60/130,097, filed Apr. 20, 1999 under 35 USC119(e).

FIELD OF THE INVENTION

The present invention relates to the field of mass storage devices. More particularly, this invention relates to bearing performance in a disc drive.

BACKGROUND OF THE INVENTION

One of the key components of any computer system is a place to store data. Computer systems have many different places where data can be stored. One common place for storing massive amounts of data in a computer system is on a disc drive. The most basic parts of a disc drive are a disc that is rotated, an actuator that moves a transducer to various locations over the disc, and electrical circuitry that is used to write and read data to and from the disc. The disc drive also includes circuitry for encoding data so that it can be successfully retrieved and written to the disc surface. A microprocessor controls most of the operations of the disc drive as well as passing the data back to the requesting computer and taking data from a requesting computer for storing to the disc.

The transducer is typically housed within a small ceramic block. The small ceramic block, also referred to as a slider, passes over the disc in a transducing relationship with the disc. The transducer can be used to read information representing data from the disc or write information representing data to the disc. When the disc is operating the disc is usually spinning at relatively high revolutions per minute (RPM). These days common rotational speeds are up to 10,000 RPM. Higher rotational speeds are contemplated for the future. The small ceramic block, or slider, is usually aerodynamically designed so that it flies over the disc. The best performance of the disc drive results when the ceramic bock is flown as closely to the surface of the disc as possible. Today's small ceramic block or slider is designed to fly on a very thin layer of gas or air. In operation, the distance, or fly height between the slider and the disc is very small. Currently, fly heights are about 0.5–1.0 micro inches. In some disc drives, the slider passes through a layer of lubricant rather than flying over the surface of the disc.

Information representative of data is stored on the surface of the memory disc. Disc drive systems read and write information stored on tracks on memory discs. Transducers, in the form of read/write heads attached to the sliders, located on both sides of the memory disc, read and write information on the memory discs when the transducers are accurately positioned over one of the designated tracks on the surface of the memory disc. The transducer is also said to be moved to a target track. As the memory disc spins and the read/write head is accurately positioned above a target track, the read/write head can store data onto a track by writing information representative of data onto the memory disc. Similarly, reading data on a memory disc is accomplished by positioning the read/write head above a target track and reading the stored material on the memory disc. To write on or read from different tracks, the read/write head is moved radially across the tracks to a selected target track. The data is divided or grouped together on the tracks. In some disc drives, the tracks are a multiplicity of concentric circular tracks. In other disc drives, a continuous spiral is one track on one side of a disc drive. Servo feedback information is used to accurately locate the transducer. The actuator assembly is moved to the required position and held very accurately during a read or write operation using the servo information.

The memory disc rotates upon a spindle. The spindle assembly contains a spindle motor having bearing assemblies such as hydrodynamic bearings or ball bearings. Bearing assemblies are used in numerous applications to allow two surfaces to be supported, guided, or rotated in relation to each other. In a disc drive, the bearing assembly allows the memory disc to be rotated at high speeds. One type of bearing assembly used in disc drive spindle motors are ball bearings. Ball bearings are bearings in which a ball rotates between an inner race and an outer race. One race is attached to a stator, or stationary, machine element. The other race is attached to a rotor, or rotational, bearing element. In a disc drive, the stator is a shaft around which the spindle assembly rotates and the rotor is the spindle assembly upon which the memory disc rests. The ball member in the ball bearing freely rotates relative to the two surfaces, allowing them to pass each other smoothly. Ball bearings are also used in many devices beyond disc drives such as in diverse machinery and automobiles.

One problem that arises when ball bearings are used in high speed applications, such as disc drives, is that the ball may periodically lose contact with the race or races. This results in errors in motion, unwanted vibration and decreased stiffness, or responsiveness, of the bearing. These problems can then lead to the slider hitting the surface of the memory disc and damaging it, or it may lead to the transducer being unable to quickly locate the correct track to perform a read/write operation. Another problem is that there is a trade-off between stiffness of the bearing and life span of the bearing. If the bearing is subject to a high preload, it does not last as long as if it was subject to a low preload. The designer must compromise between these two factors, and cannot reach optimal performance.

One general solution to the problem is to apply a preload force on the bearing to stiffen its performance. Preload is the application of an axial load to a bearing in order to eliminate free radial and axial movement. This solution may temporarily increase stiffness, but bearing performance and the level of preload needed to stiffen the bearing will change over time because of the bearing wearing down. Also, only changing preload on the bearing is ineffective to dampen gyroscopic vibrations of the bearing assembly. Another problem is that the trade-off between stiffness and life span cannot be controlled.

Hydrodynamic bearings are also used in disc drives. Hydrodynamic bearings are bearings in which a fluid gap, such as a lubricant or air, is created between the stator or stationary bearing surface and the rotor or dynamic bearing surface which faces the stator surface. The gap is created when the rotor surface is moving over the stator surface at a high enough speed. The size of the gap between the surfaces affects two variables. If the gap decreases, the stiffness of the bearing is increased, but the power dissipation increases also. However, if the gap increases, the power dissipation decreases, but the stiffness decreases also. The interplay and trade-off of these two variables can be a problem because the performance of the bearing depends on these variables being optimally set at the correct time. For example, the designer may want low power dissipation during normal operating conditions of the bearing, and high stiffness during start up of the bearing. In such a case, the designer is forced to make a compromise decision between stiffness and power dissipation and is left with a situation of less than optimal bearing performance.

Thus, what is needed is a bearing assembly in which the preload can be actively varied to optimize the stiffness/life span tradeoff, in which the preload can be varied to dampen gyroscopic vibrations, and in which the hydrodynamic gap can be varied to optimize the power dissipation/stiffness trade-off.

SUMMARY OF THE INVENTION

The present invention provides a system for improved bearing performance. The system includes a bearing assembly having a shaft member having a bearing race. A piezoelectric member opposing the bearing race is situated so that when a voltage is applied to it, it expands against the bearing race so that a preload of the bearing is varied. In one embodiment, the system includes a rotor having two outer bearing races opposing a shaft's two inner bearing races. The contact angle for the first opposing bearing races is different than for the second opposing bearing races. In one embodiment, four piezoelectric elements are attached to the assembly so that they oppose the inner bearing race. In a further embodiment, a control system is coupled to the bearing assembly for providing controlled variation of the piezoelectric members.

In one embodiment of the present system, the piezoelectric member is disposed between the shaft member and the bearing race for varying the radial position of the bearing race. In another embodiment, the piezoelectric member is disposed for varying the axial position of the bearing race.

In one embodiment, the system includes a hydrodynamic bearing assembly having a stator member having a hydrodynamic surface and a rotor member having a surface facing the stator member hydrodynamic surface. The rotor member surface and the stator member hydrodynamic surface having a gap between them when the rotor surface is moving. A piezoelectric member is attached to either the stator member or the rotor member for varying the width of said gap between said surfaces. In a further embodiment, a control system is coupled to the bearing assembly for providing controlled variation of the piezoelectric members.

Therefore, the present system provides a user with a disc drive that has a bearing assembly in which the gyroscopic vibration can be actively damped, the preload can be varied as need, and the designer has active control of the power dissipation/stiffness tradeoff and the stiffness/life span tradeoff. The disc drive is thus more dependable and has a longer life.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
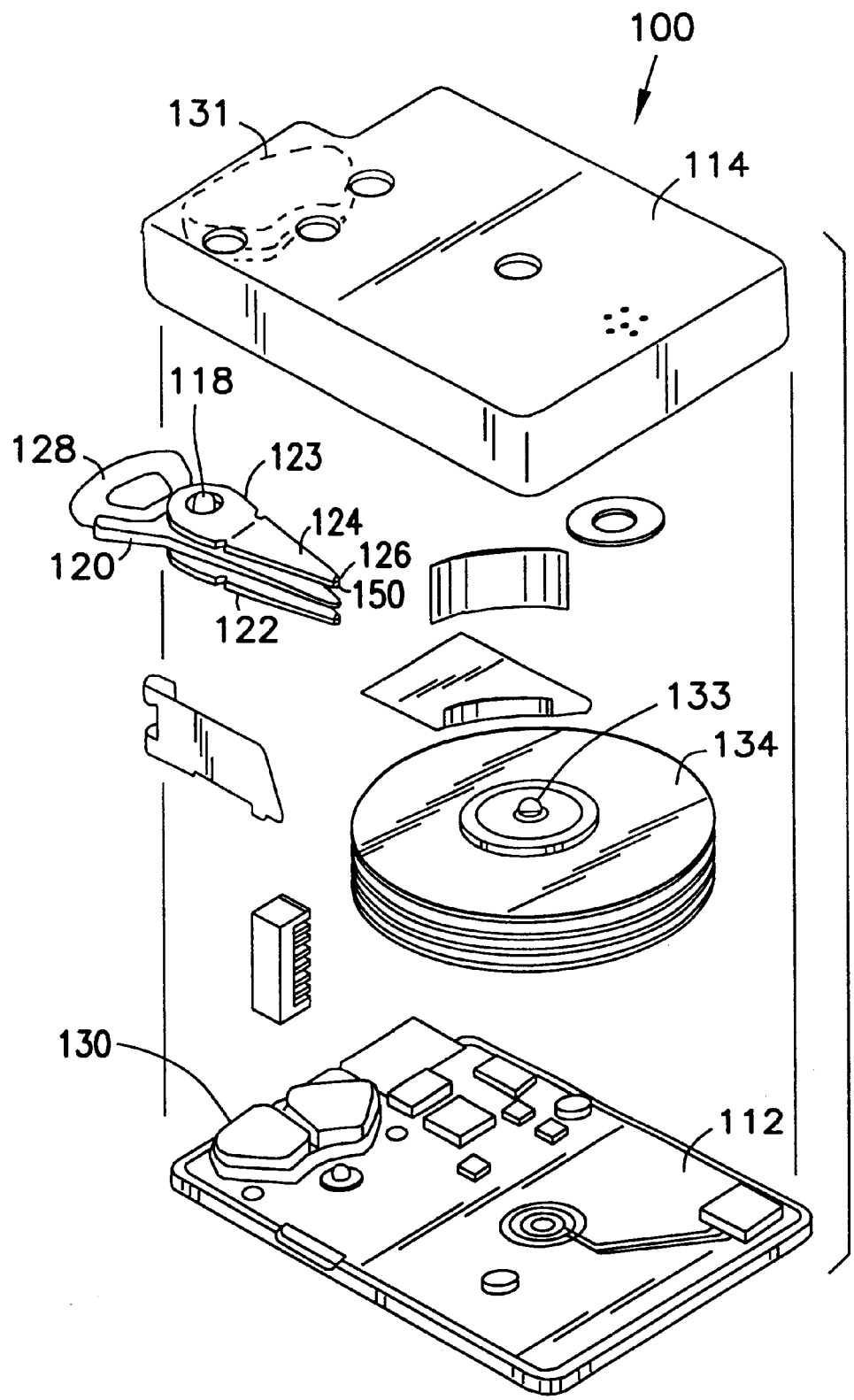
FIG. 1 is an exploded view of a disc drive with a multiple disc stack and a ramp assembly for loading and unloading transducers to and from the surfaces of the discs.

The invention described in this application is useful with all mechanical configurations of disc drives having either rotary or linear actuation. In addition, the invention is also useful in all types of disc drives including hard disc drives, zip drives, floppy disc drives and any other type of drives where unloading the transducer from a surface and parking the transducer may be desirable. FIG. 1 is an exploded view of one type of a disc drive 100 having a rotary actuator. The disc drive 100 includes a housing or base 112, and a cover 114. The base 112 and cover 114 form a disc enclosure. Rotatably attached to the base 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126 which carries a magnetic transducer 150. The slider 126 with the transducer 150 form what is many times called the head. It should be noted that many sliders have one transducer 150 and that is what is shown in the figures. It should also be noted that this invention is equally applicable to sliders having more than one transducer, such as what is referred to as an MR or magneto resistive head in which one transducer 150 is generally used for reading and another is generally used for writing. On the end of the actuator arm assembly 120 opposite the load springs 124 and the sliders 126 is a voice coil 128.

Attached within the base 112 is a first magnet 130 and a second magnet 131. As shown in FIG. 1, the second magnet 131 is associated with the cover 114. The first and second magnets 130, 131, and the voice coil 128 are the key components of a voice coil motor which applies a force to the actuator assembly 120 to rotate it about the actuator shaft 118. Also mounted to the base 112 is a spindle motor. The spindle motor includes a rotating portion called the spindle hub 133. In this particular disc drive, the spindle motor is within the hub. In FIG. 1, a number of discs 134 are attached to the spindle hub 133. In other disc drives a single disc or a different number of discs may be attached to the hub. The invention described herein is equally applicable to disc drives which have a plurality of discs as well as disc drives that have a single disc. The invention described herein is also equally applicable to disc drives with spindle motors which are within the hub 133 or under the hub.

Figure 2:
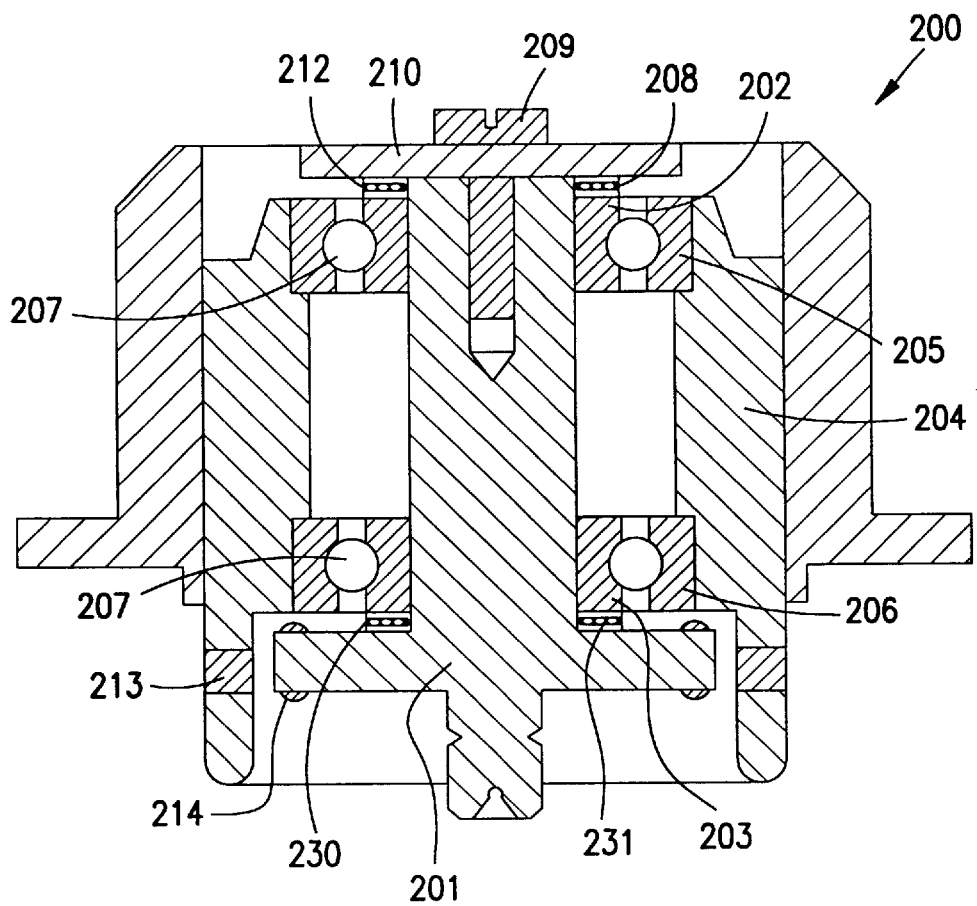
FIG. 2 is a side view of one embodiment of a ball bearing assembly according to the present invention.
Figure 3:
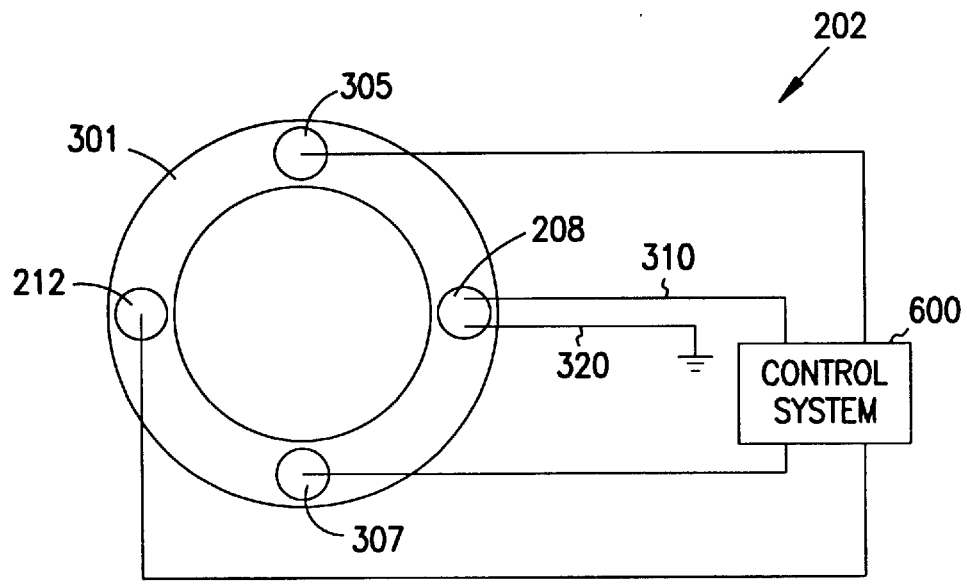
FIG. 3 is a top view of one embodiment of a ball bearing race according to the present invention.

FIGS. 2 and 3 show an exemplary ball bearing assembly 200 in which one embodiment of the present system is used. Bearing assembly 200 is located within the spindle motor, which can be within or under the spindle hub 133. Bearing assembly 200 includes a shaft member 201 and a rotor member 204. In this embodiment, shaft 201 is a stator member of bearing assembly 200. However, those skilled in the art will recognize that the present system could be applied if shaft 201 was the rotor and rotor 204 was stationary. The terms stator and rotor are merely used as reference terms to allow explanation of the examples herein. The terms refer to the relative motion of the two members. Bearing assembly 200 includes rotor magnets 213 attached to rotor member 204, and stator coil 214 attached to shaft member 201. When electricity is provided to stator coil 214, rotor member 204 is caused to rotate.

Shaft 201 includes a first bearing race 202 and a second bearing race 203. First race 202 is mounted on an upper portion of shaft 201 and second race 203 is mounted on a lower portion of shaft 201. Rotor 204 includes a first outer bearing race 205 and a second outer bearing race 206. Outer bearing race 205 is attached to rotor 204 so that it is located in opposition to, and facing, first bearing race 202. Outer bearing race 206 is attached to rotor 204 so that it is located in opposition to, and facing, second bearing race 203. A plurality of rollers 207 are disposed between outer race 206 and second race 203, and between race 205 and race 202. In one embodiment, rollers 207 are sphere shaped balls. Alternatively, rollers 207 can be cylindrically shaped roller bearings or needle bearings.

Bearing assembly 200 also includes an electrically activated member such as a piezoelectric member 208. Piezoelectric member 208 is an electrically activated means for moving or applying force to the bearing race as will be explained below. By moving the bearing race, bearing assembly vibrations can be actively damped, the bearing preload can be actively varied, and stiffness of the bearing can be controlled, for example.

Piezoelectric member 208 is attached to a top plate 210, which is located above shaft 201, proximate to first bearing race 202 and first outer bearing race 205. A connector, such as screw 209, is removably connected to shaft 201. Screw 209 holds top plate 210 in position. Piezoelectric member 208 is situated so that it opposes bearing race 202 in an axially direction. By loosening or tightening screw 209, the user can change the nominal preload applied to the bearing race opposing the top plate 210. This permits the user to set a maximum or minimum preload level, which can then be controllably varied as will be explained below.

In one embodiment, piezoelectric member 208 has a piezoelectric voltage constant g(33) of approximately 25–30 Vm/N, such as a Phillips type PXE 41 piezoelectric element (available from American Piezo Ceramics, Mackeyville, Pa. 17750). Piezoelectric member 208 can also be other materials, such as barium titanate or lead zirconate titanate, for example. In one embodiment, member 208 is approximately 2 mm thick. Member 208 is polarized in an axial direction so that when a voltage is applied, it will have a mechanical deformation in the axial direction, in this case, against the first bearing race 202. Conversely, when bearing race 202 applies a mechanical stress against piezoelectric member 208 due to bearing vibration, for example, a measurable voltage is produced by the piezoelectric member 208.

Piezoelectric member is coupled to an electrical connector 310 and an electrical connector 320. In one embodiment, connector 320 is grounded, and electrical connector 310 is coupled to a control system 600. Control system 600 can include a variable voltage source so that the level of voltage applied to the piezoelectric member varies as needed. In one embodiment, control system 600 includes a sensor for sensing the voltage produced by piezoelectric member 208 when it is subject to a stress due to vibration.

In one embodiment, bearing assembly 200 can also include additional piezoelectric members, such as members 212, 305, and 307. Piezoelectric members 208, 212, 305, and 307 are attached to top plate 210 so that they oppose a top surface 301 of first bearing race 202 at positions relatively symmetrical around the circumference of surface 301. For example, one such position is that one of the piezoelectric members is relatively positioned at a twelve o'clock position and the others are positioned at three o'clock, six o'clock, and nine o'clock respectively. Those skilled in the art will recognize that the present system can also be applied to a bearing assembly having more than four piezoelectric members arranged in other orders. Each piezoelectric member is independently coupled to control system 600.

Figure 5:
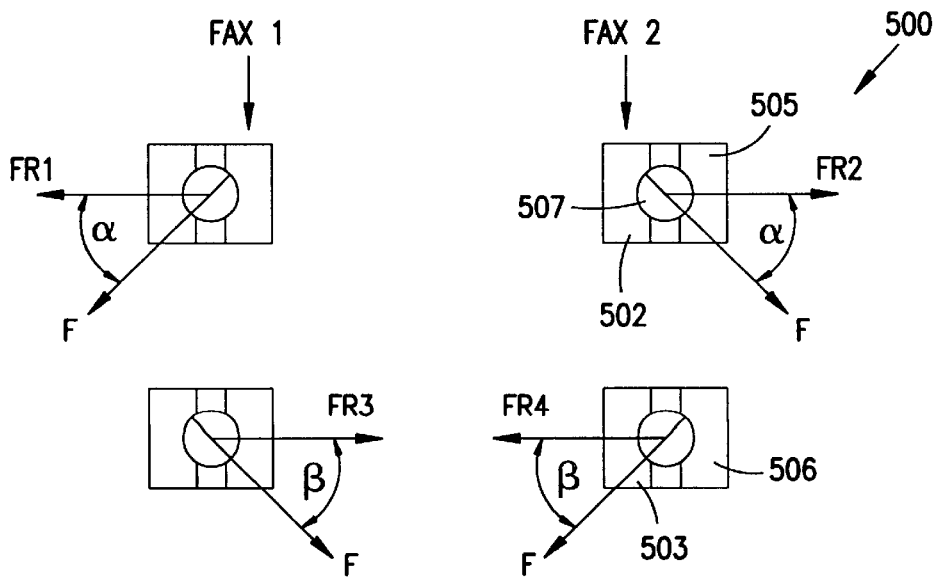
FIG. 5 is a schematic drawing of the contact angles of one embodiment of a ball bearing assembly according to the present invention.

In one embodiment, rollers 207 and races 202 and 205 form a bearing called an angular contact bearing, and rollers 207 and races 203 and 206 form a bearing assembly called an angular contact bearing. The position of rollers 207 between races 203 and 205 and between races 203 and 206 is exemplified in FIG. 5. FIG. 5 shows a schematic representation of an angular contact bearing assembly 500 similar to bearing assembly 200. Comparing FIG. 5 to FIG. 2, rollers 207 are similar to rollers 507, and races 202, 205, 203, and 206 are similar to races 502, 505, 503, and 506 respectively. Referring to FIG. 5, rollers 507 are disposed so that there is a contact point between roller 507 and first bearing race 502, and a contact point between ball 507 and first outer bearing race 505. A contact angle α is defined by an angular contact line formed by the contact points relative to the radial direction. Those skilled in the art will recognize that in angular contact bearings, such as bearing assembly 200, contact angle α is commonly between 15 degrees and 40 degrees. In one embodiment, the angle α is between 15 degrees and 25 degrees.

Rollers 507 are also disposed so that there is a contact point between roller 507 and second bearing race 503, and a contact point between ball 507 and second outer bearing race 506. A contact angle β is defined by an angular contact line formed by the contact points relative to the radial direction. Those skilled in the art will recognize that in angular contact bearings, such as bearing assembly 200, contact angle β is commonly between 15 degrees and 40 degrees. In one embodiment, the angle β is between 15 degrees and 25 degrees.

Referring again to FIG. 2, in one embodiment, contact angle α, defined by the angular contacts points of first bearing race 202 and first outer bearing race 205, is different than contact angle β, defined by the angular contact points of second bearing race 203 and second outer bearing race 206. If the axial preload applied by piezoelectric member 208 to first bearing race 202 is increased, then the radial force will increase also. Referring to FIG. 5, the relationship between an axial preload force ($F_{ax}$) and a resultant radial force ($F_R$) is: $F_R = F_{ax}/\tan(\text{contact angle})$. If contact angle α of bearing assembly 200 is not equal to contact angle β, then $F_R$ will be different for the first and second races. For example, if α is equal to 15 degrees and β is equal to 25 degrees, then an axial preload force of $F_{ax1} = F_{ax2} = 10$ N applied to race 202 would result in a radial force on the upper race of $F_{R1} = F_{R2} = 10$ N/tan(15) = 37.3 N, and a radial force on the lower race of $F_{R3}=F_{R4}=10$ N/tan(25)=21.4 N. Furthermore, if an asymmetric preload is applied (for example, if piezoelectric member 212 delivers a force of $F_{ax1}=20$ N and member 208 delivers a force of $F_{ax2}=10$ N), then the radial forces on the upper race itself will also be different from each other ($F_{R2}=10$ N/tan(15)=37.3 N; $F_{R1}=20$ N/tan(15)=74.6 N). And the radial forces on the lower race will be different from each other ($F_{R3}=20$ N/tan(25)=42.9 N; $F_{R4}=10$ N/tan(25)=21.4 N).

Thus, by providing dissimilar axial preload forces to angular contact bearing having different contact angles, the present system permits a changing of the moment on the bearing assembly as a whole and thus a damping of gyroscopic vibrations and other vibrations. Alternatively, contact angles α and β can be equal if the bearing designer only needs to control stiffness and/or preload.

In one embodiment, bearing assembly can also contain piezoelectric members opposing the second bearing race, such as members 230 and 231 in addition to or instead of members 208, 212, 305, and 307.

Figure 4:
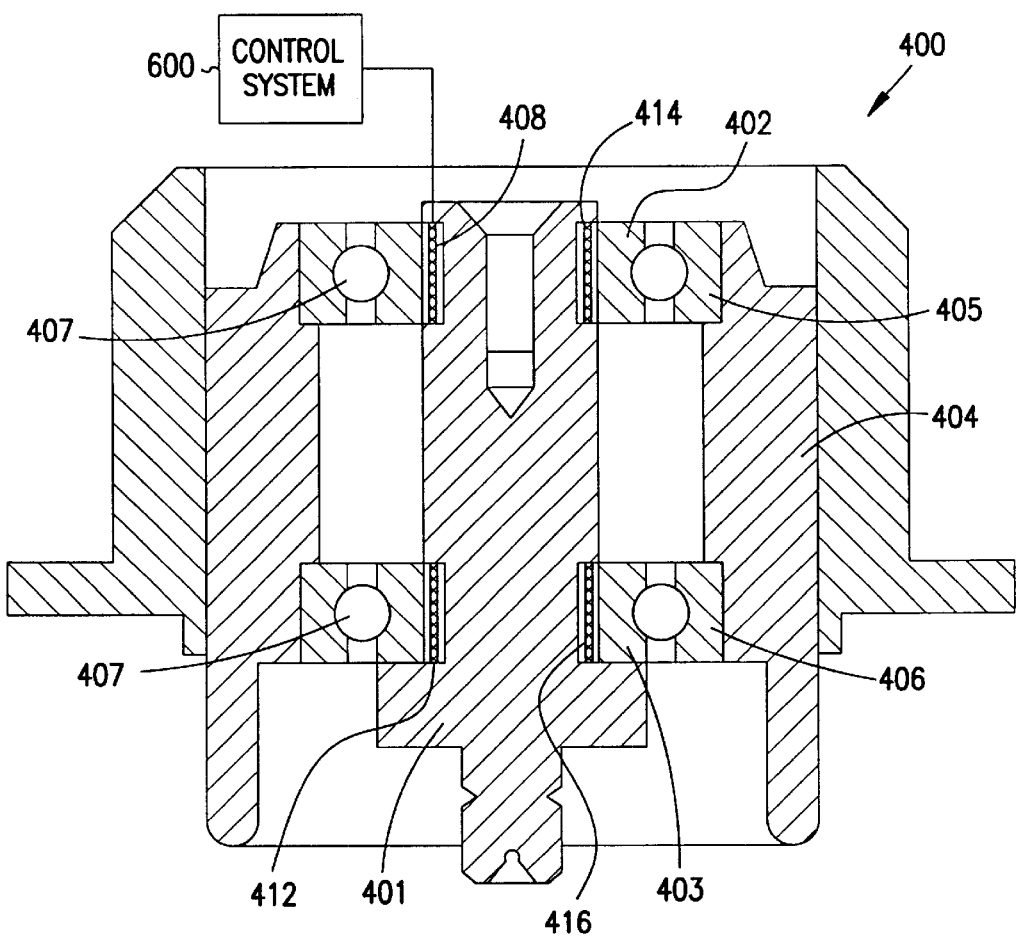
FIG. 4 is a side view of another embodiment of a ball bearing assembly according to the present invention.

FIG. 4 shows one embodiment of a ball bearing assembly 400 according to the present invention. Assembly 400 includes a shaft member 401 and a rotor member 404. In one embodiment, shaft 401 is a stator member of bearing assembly 400. However, those skilled in the art will recognize that the present system could be applied if shaft 401 was the rotor and rotor 404 was stationary. The terms rotor and stator are only used to indicate relative motion. Shaft 401 includes a first bearing race 402 and a second bearing race 403. Rotor 404 includes a first outer bearing race 405 and a second outer bearing race 406. Outer bearing race 405 is attached to rotor 404 so that it is located in opposition to first bearing race 402, and outer bearing race 406 is attached to rotor 404 so that it is located in opposition to second bearing race 403. A plurality of rollers 407 are disposed between outer race 406 and race 403, and between race 405 and race 402. In this embodiment, rollers 407 are sphere shaped balls; rollers 207 can also be cylindrically shaped roller bearings or needle bearings.

In one embodiment, bearing assembly 400 includes angular contact bearings in which angle α, defined by the angular contacts points of first bearing race 402 and first outer bearing 405, is different than angle β, defined by the angular contact points of second bearing race 403 and second outer bearing race 406. Alternatively, in some aspects of the present system, angles α and β can be equal, as explained above.

Bearing assembly 400 also includes an electrically activated member such as a piezoelectric member 408. Piezoelectric member 408 is attached to shaft 401. Piezoelectric member 408 opposes first bearing race 402 in a radial direction. When a voltage is applied to piezoelectric member 408, member 408 expands in a radial direction. This causes first bearing race 402 to expand radially. This permits the user to control the preload of the bearing assembly, and to dampen vibrations as described above concerning assembly 200. Assembly 400 can contain more than one piezoelectric member, for example it can include piezoelectric element 414, 412, and 416. Those skilled in the art will recognize that other piezoelectric members could be added to the system.

In one embodiment, each piezoelectric element is independently coupled to a control system 600. Control system 600 delivers a voltage to piezoelectric members 408, 412, 414, or 416 when the radial position of the bearing race needs to be adjusted to damp vibrations or increase preload.

Figure 6:
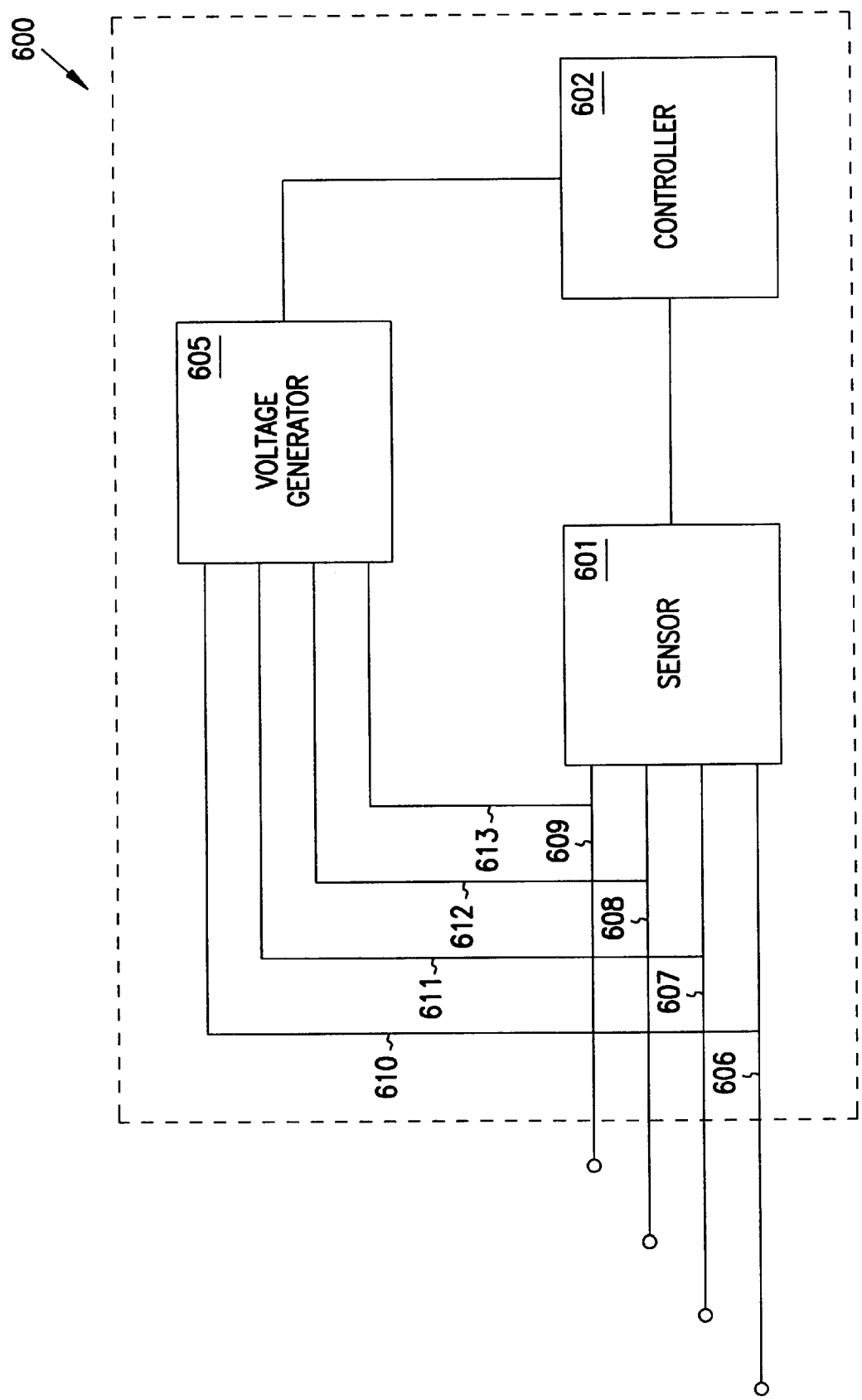
FIG. 6 is a schematic drawing of one embodiment of a control system according to the present invention.

FIG. 6 shows a block diagram of portions of a bearing control system 600. In one embodiment, control system 600 includes a signal processor 601, a controller 602, and a voltage generator 605. Control system 600 also includes inputs 606–609. Inputs 606–609 are coupled to electrically activated members such as piezoelectric members. When a stress or force is applied to the piezoelectric members, they develop an electric potential. This signal is received by control system 600 through inputs 606–609. In one embodiment, other inputs can be received by control system 600, such as bearing rotational speed. Signal processor 601 includes amplifiers and circuits to filter and amplify the electrical signals from inputs 606–609. Controller 602 is coupled to signal processor 601. Controller 602 includes one or more microprocessors and logic circuits for execution of software or firmware instructions. The software of controller 602 is modifiable to provide different functions. The output of controller 602 is dependent on the input to it from signal processor 601. Voltage generator 605 includes capacitors, amplifiers and circuits for developing a variable range of voltages to be applied to piezoelectric elements which are coupled to its outputs 610–613. It is contemplated that using a piezoelectric element with g(33) of 25–30e-3 Vm/N, such as PXE 41 by Phillips, voltages in the range of 1–50 volts will be delivered.

When a change in force is applied upon one of the piezoelectric members, the member delivers an electric signal to signal processor 601. Signal processor 601 processes the signal. One skilled in the art will recognize that the signal can be processed in a variety of manners. For example, signal processor 601 can amplify the signal and apply a band-pass filter to it to filter the signal of the desired signal frequency. Additionally, a windowing function can process the sampled signal. The sensor sends the processed signal to the controller 602.

Figure 7:
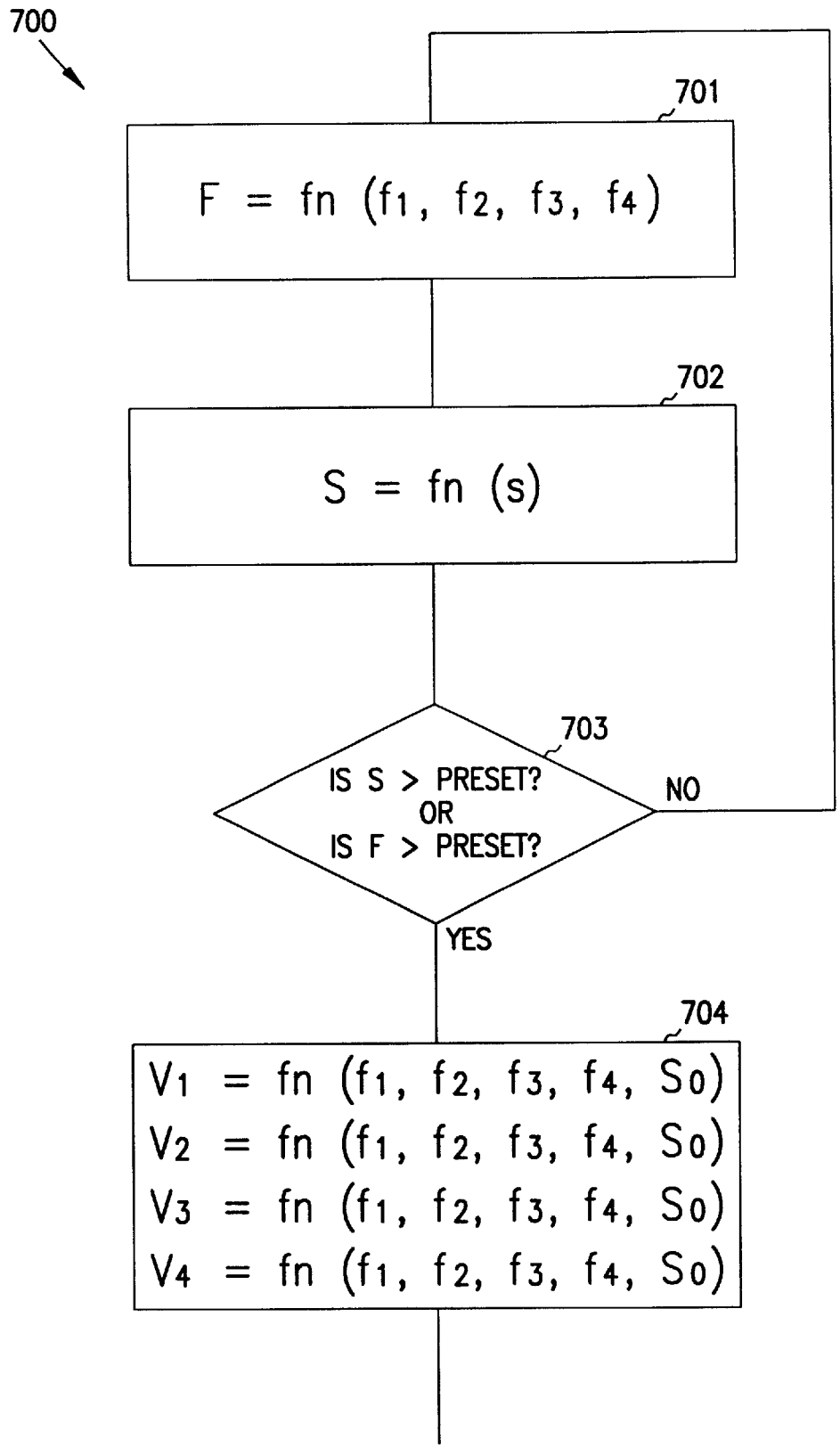
FIG. 7 is one embodiment of a flow chart of a controller according to the present invention.

FIG. 7 shows a flow chart of one embodiment of the analyses method 700 performed by controller 602. Method 700 includes setting, in block 701, a variable (F) which is a function of the inputs f1, f2, f3, f4, which are from various piezoelectric members. The input signals f1, f2, f3, f4 signify the force upon the piezoelectric elements individually. (F) is a variable which signifies the overall gyroscopic vibration of the bearing assembly. Method 700 includes setting, in block 702, a variable (S) signifying rotational speed of the bearing assembly from an input signal (s). In block 703, method 700 analyzes whether the variable (F) is greater than a preset vibration level and whether variable (S) is greater or less than a preset speed level. If either (S) or (F) indicate a need for a change in preload or a need to dampen vibration then method 700 goes to block 704. In block 704, the method sets output signals which signify voltages v1, v2, v3, v4 to be applied to various piezoelectric members. In one embodiment, the voltage v1, v2, v3, v4 are set as functions of the input signals f1, f2, f3, f4, and (s).

Figure 8:
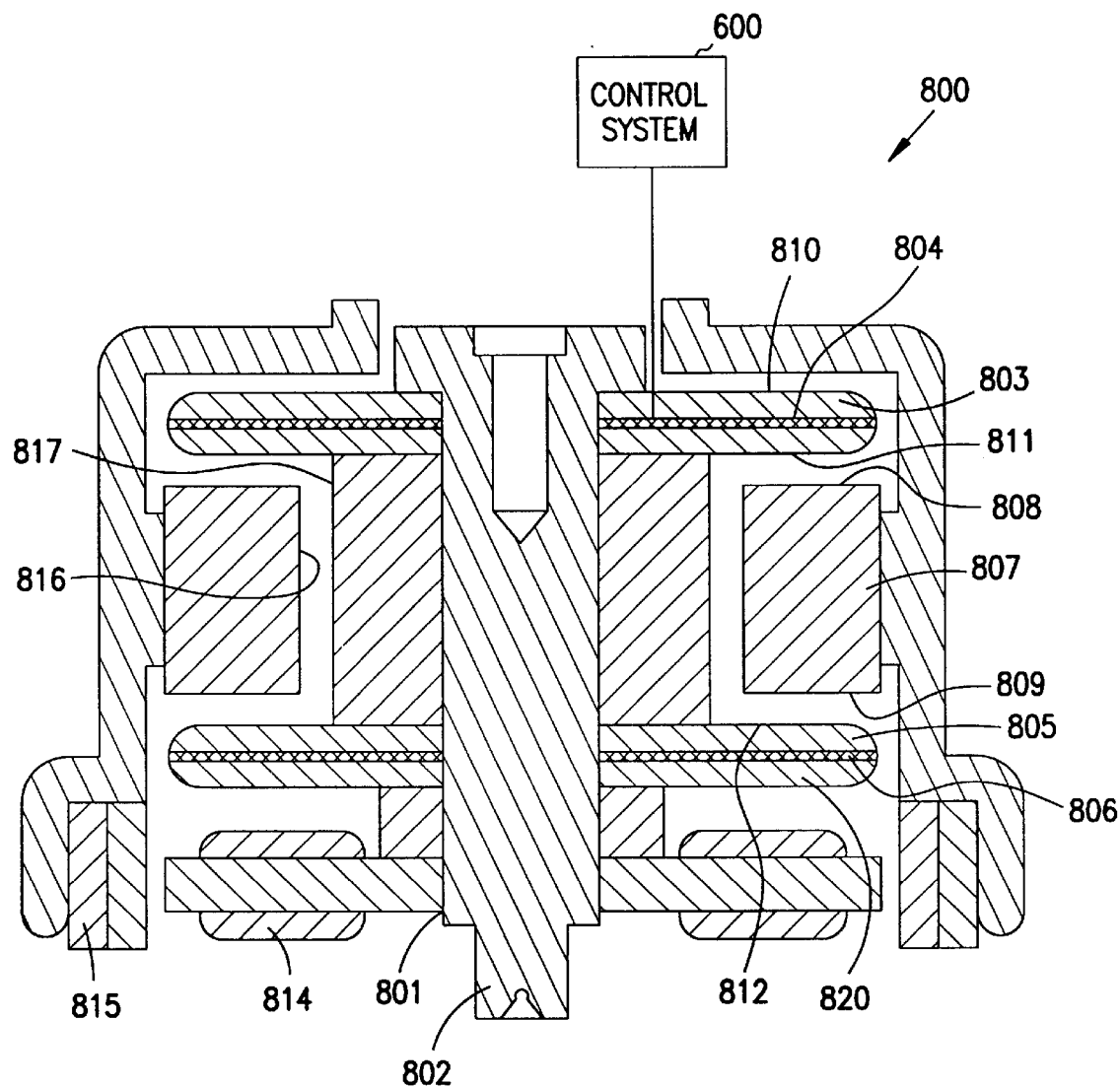
FIG. 8 is a side view of one embodiment of a hydrostatic bearing according to the present invention.

In one embodiment, for example, if the input signals indicate a gyroscopic vibration that needs to be damped, method 700 includes analyzing which of the piezoelectric members needs to be expanded or contracted to provide damping to the bearing. In one embodiment, for another example, if the input indicates that the bearing is slowing down, the voltages can be varied to increase the preload on the bearing to provide higher stiffness, and if the inputs indicate that the bearing is speeding up, the voltages can be varied to decrease the preload and increase the life span of the bearing. Those skilled in the art will recognize that these exemplary functions for changing preload and damping vibrations can be combined with each other in control system 600 or done separately. Furthermore, other functions and these exemplary functions can be combined to provide functionality to control other performance variables in a bearing assembly:

FIG. 8 shows one embodiment of a bearing assembly 800 according to the present invention. Bearing assembly 800 is within the spindle motor of the disc drive, which can be within or under spindle hub 133. Bearing assembly 800 includes a pair of relatively moving members, such as a rotor member 807 and a stator member 801. It is noted that the terms rotor and stator are used as relative motion terms. Stator member 801 includes a shaft 802. Stator member 801 also includes an outer radial hydrodynamic bearing surface 817, a first thrust plate 803, and a second thrust plate 805. Thrust plates 803 and 805 have hydrodynamic thrust bearing surfaces 811 and 812, respectively. Hydrodynamic thrust bearing surfaces 811 and 812 have a grooved pattern such as a herringbone groove pattern or a spiral pattern or any other pattern permitting a hydrodynamic barrier or fluid-filled gap to form. It is also noted that bearings designed to rotate at relatively low speeds (<2,500 RPM) generally do not have a grooved pattern. The grooved pattern upon thrust bearing surfaces 811 and 812 creates a hydrodynamic pressure when rotor member 807 rotates around stator member 801 and shaft 802. Rotor member 807 is coupled with rotor magnets 815, which confront stator coil 814. When electricity is provided to stator coil 814, rotor 807 is caused to rotate. Rotor 807 then provides rotational power to computer disc 134. Alternatively, the bearing can be used in other mechanical devices, such as a VCR head assembly or a laser scanner motor, for example.

Rotor member 807 includes a top hydrodynamic bearing surface 808 facing thrust bearing surface 811 and a bottom hydrodynamic bearing surface 809 facing thrust bearing surface 812. Rotor member 807 also includes an inner radial hydrodynamic bearing surface 816 facing stator radial bearing surface 817. Rotor member surfaces 811 and 812 are substantially perpendicular to surface 816.

When rotor member 807 rotates around stator member 801, a hydrodynamic layer is formed between thrust bearing surface 812 and rotor member surface 809 and the surfaces tend to separate, creating a fluid-filled gap. When rotor member 807 slows down, rotor member surface 809 tends to move toward surface 812 until, when at rest, the two surfaces tend to come into contact. If thrust hydrodynamic bearing surface 811 or radial hydrodynamic bearing surface 817 also contain hydrodynamic grooves, then a hydrodynamic boundary and fluid-filled gap is formed between those surfaces and their opposing surfaces also. Those skilled in the art will recognize that different variations of grooves and surfaces are possible when designing a hydrodynamic bearing.

Bearing assembly 800 also includes an electrically activated member such as a piezoelectric member 804. The electrically activated member is an electrically activated means for changing the fluid-filled gap size in the bearing assembly. Piezoelectric member 804 is sandwiched between the top surface 810 and bottom surface 811 of thrust plate 803. When a voltage is applied to piezoelectric member 804, piezoelectric member 804 expands in an axially direction. This expansion forces surface 811 to move toward surface 804 and the gap between surface 811 and 804 becomes smaller. Advantageously, the smaller gap results in increased bearing stiffness relative to the larger gap. When the voltage is removed or a smaller voltage is applied to piezoelectric member 804, it retracts and the gap between surfaces 811 and 804 increases. The larger gap results in a decrease in power dissipation. Thus, the bearing assembly can have a relatively large gap having low stiffness and low power dissipation, or a relatively small gap having high stiffness and high power dissipation. Advantageously, the present system permits a designer to actively control the gap dimensions. Thus, the designer has control over which variable to maximize or minimize during bearing operation.

In one embodiment, control system 600 is coupled to bearing assembly 800. Control system 600 receives input from the bearing assembly representing bearing speed. As explained above, control system 600 can include one or more microprocessors and logic circuits for execution of software or firmware instructions. The software of control system 600 is modifiable to provide different functions. Control system 600 is coupled to piezoelectric member 804 to provide a voltage when it is needed. Software or firmware in controller 602 optimizes the gap size to account for the stiffness/power dissipation trade-off.

Figure 11:
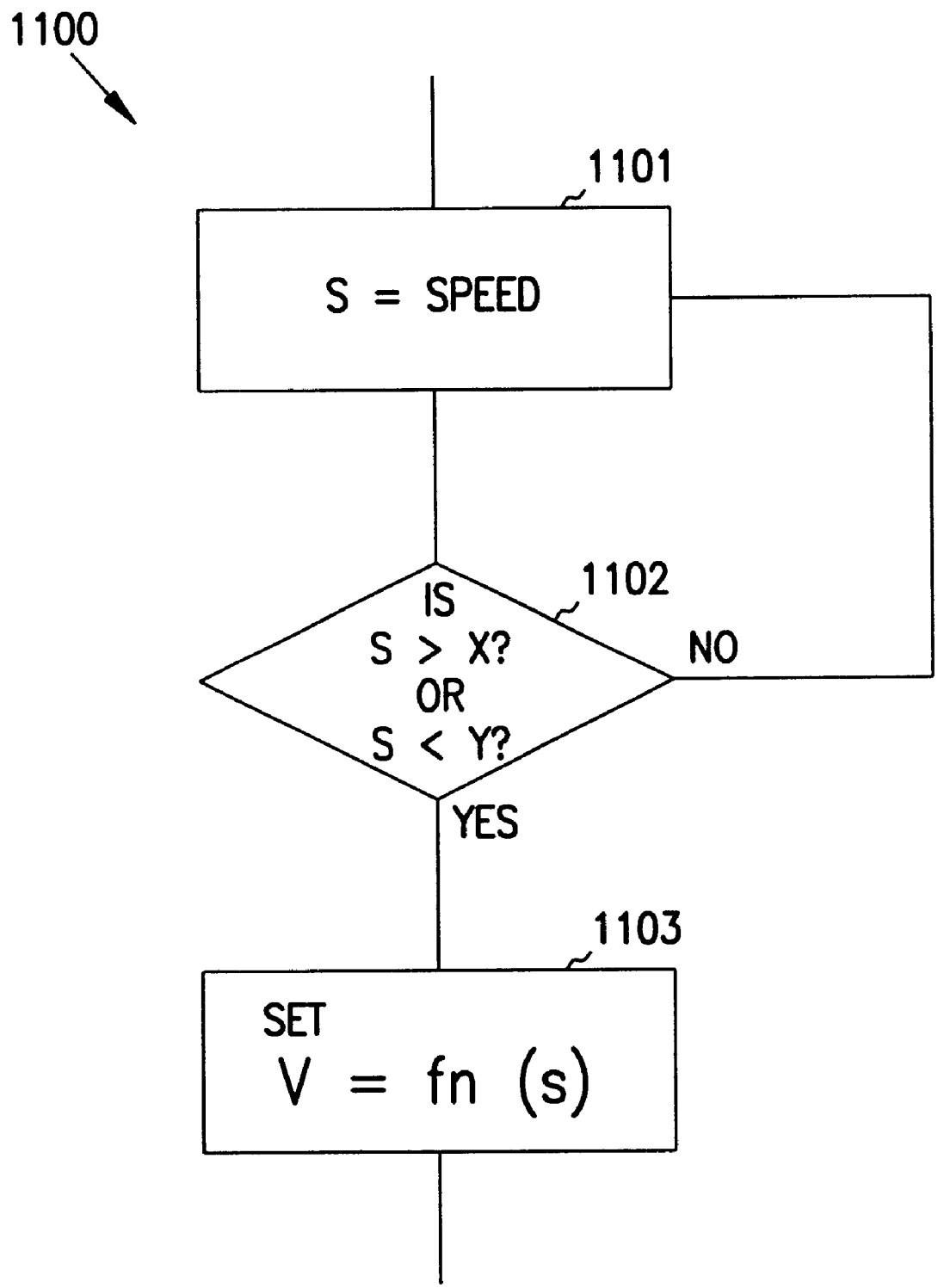
FIG. 11 is one embodiment of a flow chart of a controller according to the present invention.

FIG. 11 shows a flow chart of one embodiment of a method 1100 performed by controller 602. Method 1100 includes setting, in block 1101, a variable (S) signifying rotational speed of the bearing assembly. The method, in block 1102, analyses whether the variable (S) is greater than a preset speed level (X) and/or whether (S) is less than a preset speed level (Y). If the variable (S) indicates a need for a change in gap size then the method goes to block 1103 and a voltage (V) is applied to a piezoelectric member. The voltage (V) is set as a function of the input signal (S).

In one embodiment, for example, if the input indicates that the bearing is slowing down, the voltage applied to the piezoelectric member can be increased to decrease the gap of the bearing to provide higher stiffness, and if the inputs indicate that the bearing is speeding up, the voltage can be decreased to increase the size of the gap and provide for less power dissipation. Those skilled in the art will recognize that these exemplary functions for changing power dissipation and stiffness can be combined with other functions to provide functionality to control other performance variables in a bearing assembly.

In one embodiment, bearing assembly 800 also includes a lower piezoelectric member 806 sandwiched between the top surface 812 and bottom surface 820 of thrust plate 805. When a voltage is applied to piezoelectric member 806, piezoelectric member 806 expands in an axially direction. This expansion forces surface 812 to move toward surface 809 and the gap between surface 812 and 809 becomes smaller. When the voltage is removed or a smaller voltage is applied to piezoelectric member 806, the member retracts and the gap between surfaces 812 and 809 increases. Thus, the bearing assembly can have a relatively large gap having low stiffness and low power dissipation, or a relatively small gap having high stiffness and high power dissipation.

Figure 9:
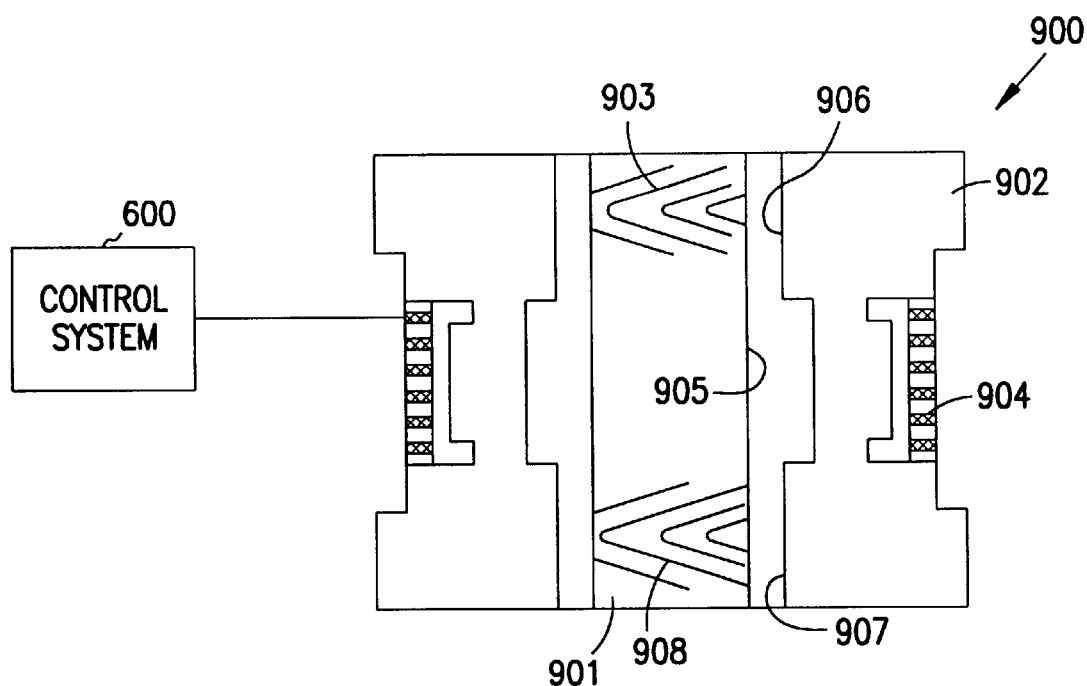
FIG. 9 is a side view of one embodiment of a journal bearing according to the present invention.

FIG. 9 shows one embodiment of a journal or radial bearing 900 according to the present invention. In one embodiment, radial bearing 900 can be implemented in a bearing assembly such as bearing assembly 800 as radial hydrodynamic surface 817 and facing surface 816. Alternatively, it can be used in other applications requiring a journal or a radial bearing. Journal or radial bearing 900 includes a shaft 901. In one embodiment, shaft 901 is a stator element. Alternatively, journal or radial bearing 900 can be used in an application wherein shaft 901 is as a rotor element. Shaft 901 can be machined from a metal or a ceramic material.

Shaft 901 includes upper hydrodynamic grooves 903 and lower hydrodynamic grooves 908 upon a radial surface 905. Grooves 903 and 908 can be herringbone shape, spiral shape, or other shapes as known to those skilled in the art.

Alternatively, the radial surface 905 can contain only one set of grooves or three or more sets. Facing radial surface 905 of shaft 901 is a rotor member 902 having an upper radial bearing surface 906 facing grooves 903, and a lower radial bearing surface 907 facing grooves 908. When rotor member 902 rotates around shaft 901, grooves 903 and 908 cause a hydrodynamic or fluid-filled gap to be formed between shaft 901 and rotor 902.

Rotor member 902 includes an electrically activated member such as a piezoelectric member 904. Piezoelectric member 904 is attached to an outer, middle portion of rotor member 904. Piezoelectric member 904 is aligned so that when a voltage is applied to it, it expands in an axial direction. This causes the outer, middle portion of rotor member 902 to expand axially, which forces rotor member 902 to bend so that upper radial bearing surface 906 comes closer to grooves 903 and lower radial bearing surface 907 comes closer to grooves 908. Advantageously, the resulting smaller gap provides for stiffer bearing performance. When a smaller voltage, or no voltage at all is applied to piezoelectric member 904, the outer portion of rotor member 902 contracts, causing upper radial bearing surface 906 to move away from grooves 903 and lower radial bearing surface 907 to move away from grooves 908. This results in decreased power dissipation.

In one embodiment, journal or radial bearing assembly 900 can be coupled to control system 600. The control system 600 can be coupled to piezoelectric member 904. Thus, control system 600 can control the gap size as explained above for bearing assembly 800.

Figure 10:
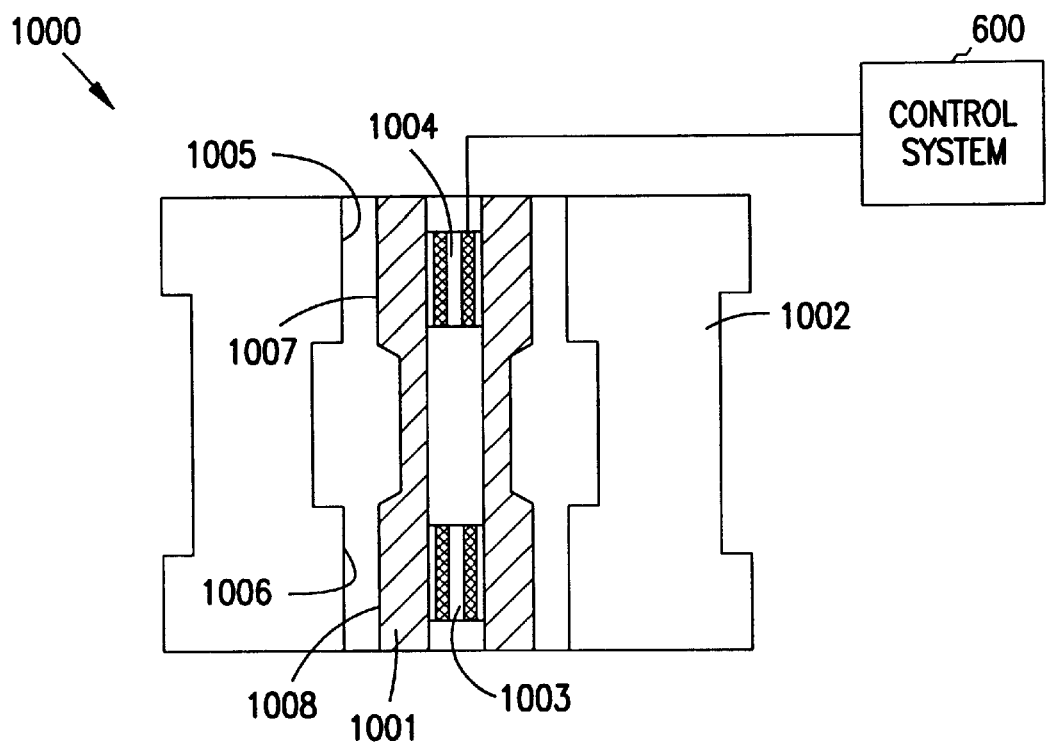
FIG. 10 is a side view of another embodiment of a journal bearing according to the present invention.

FIG. 10 shows one embodiment of a journal or radial bearing assembly 1000. In one embodiment, radial bearing 1000 can be implemented in a bearing assembly such as bearing assembly 800 as radial hydrodynamic surface 817 and facing surface 816. Alternatively, it can be used in other applications requiring a journal or a radial bearing. Journal or radial bearing 1000 includes a shaft 1001. In one embodiment, shaft 1001 is a stator element. Alternatively, journal or radial bearing 1000 can be used in an application wherein shaft 1001 is used as a rotor element. It is noted that the terms rotor and stator are used to indicate relative motion between the elements or members. Shaft 1001 can be machined from a metal or a ceramic material.

Shaft 1001 includes upper hydrodynamic grooves (not shown) upon an upper radial bearing surface 1007 and lower hydrodynamic grooves (not shown) upon a lower radial bearing surface 1008. The hydrodynamic grooves can be herringbone shape, spiral shape, or other shapes, as known to those skilled in the art. Alternatively, shaft 1001 can contain only one set of grooves or three or more sets.

A rotor member 1002 is disposed to rotate around shaft 1001. Rotor member 1002 includes an upper bearing surface 1005 facing shaft upper radial bearing surface and a lower bearing surface 1006 lower radial bearing surface 1008. When rotor member 1002 rotates around shaft 1001, the hydrodynamic grooves cause a gap to be formed between shaft 1001 and rotor 1002.

Shaft 1001 includes an electrically activated member such as a piezoelectric member 1004. Piezoelectric member 1004 is disposed within shaft 1001. Piezoelectric member 1004 is oriented so that when a voltage is applied to it, it expands in a radial direction. This causes upper radial bearing surface 1007 to be expanded and move closer to upper bearing surface 1005. In one embodiment, a second piezoelectric member 1003 is disposed within shaft 1001. Second piezoelectric member 1003 is oriented so that when a voltage is applied to it, it expands in a radial direction. This causes lower radial bearing surface 1008 to be expanded and move closer to lower bearing surface 1006. When the gap becomes smaller, the bearing assembly's stiffness increases.

When a smaller voltage, or no voltage at all is applied to piezoelectric member 1004 or piezoelectric member 1003, the gap widens. This results in decreased power dissipation.

In one embodiment, journal or radial bearing assembly 1000 can be coupled to control system 600. The control system 600 can be coupled to piezoelectric member 1004 and piezoelectric member 1003. Thus, control system 600 can control the gap size as explained above for bearing assembly 800.

Advantageously, the present system provides a user with a disc drive that has a bearing assembly in which the gyroscopic vibration can be actively damped, the preload can be varied as need, and the designer has active control of the power dissipation/stiffness tradeoff and the stiffness/life span trade-off The disc drive is thus more dependable and has a longer life.

Figure 12:
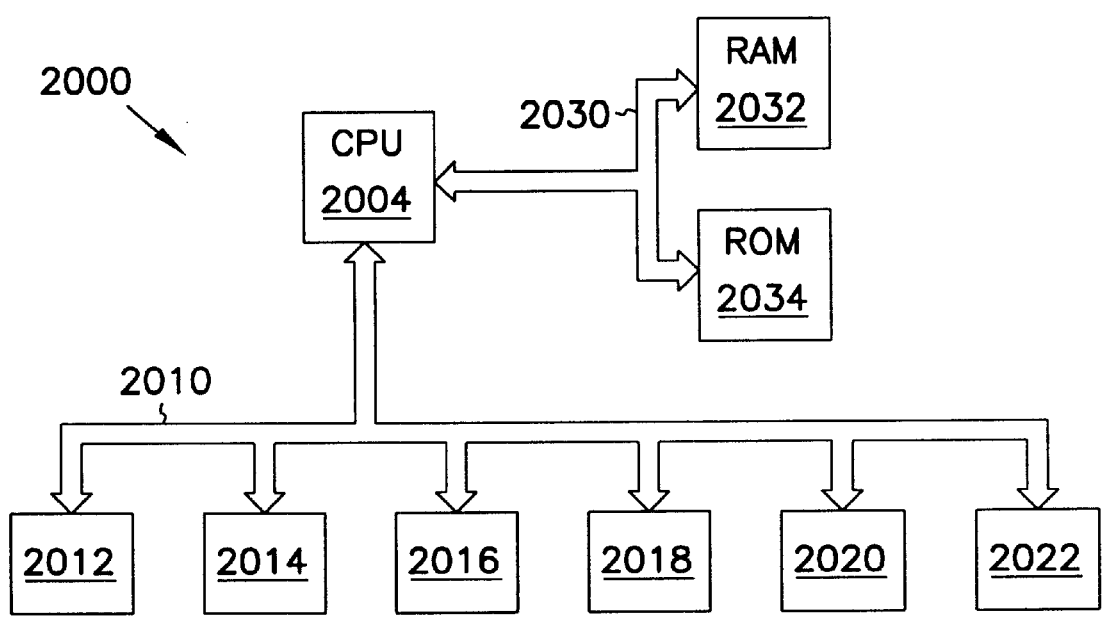
FIG. 12 is a schematic view of a computer system.

FIG. 12 is a schematic view of a computer system. Advantageously, the invention is well-suited for use in a computer system 2000. The computer system 2000 may also be called an electronic system or an information handling system and includes a central processing unit, a memory and a system bus. The information handling system includes a central processing unit 2004, a random access memory 2032, and a system bus 2030 for communicatively coupling the central processing unit 2004 and the random access memory 2032. The information handling system 2002 includes a disc drive device which includes the ramp described above. The information handling system 2002 may also include an input/output bus 2010 and several devices peripheral devices, such as 2012, 2014, 2016, 2018, 2020, and 2022 may be attached to the input output bus 2010. Peripheral devices may include hard disc drives, magneto optical drives, floppy disc drives, monitors, keyboards and other such peripherals. Any type of disc drive may use the method for loading or unloading the slider onto the disc surface as described above.

Conclusion

In conclusion, a bearing assembly 200 comprising a shaft member 201 having a first bearing race 202, an electrically activated member such as piezoelectric member 208 opposing said bearing race 202, the piezoelectric member 208 situated so that when a voltage is applied to it the at least one piezoelectric member 208 expands against the bearing race 202. Bearing assembly 200 can include a control system 600 coupled to the at least one piezoelectric member 208 for varying the voltage applied to the at least one piezoelectric member 208. When the control system 600 receives an input signal from the at least one piezoelectric member 208 signifying a vibration of the bearing assembly 200, the control system 600 outputs an output signal to the at least one piezoelectric member 208 dependent on the input signal, the output signal causing the piezoelectric member 208 to damp said vibration. Bearing assembly 200 can include a first bearing race 202 and first outer bearing race 205 have a contact angle $\alpha$, and the second bearing race 203 and second outer bearing race 206 have a contact angle $\beta$, the contact angle $\alpha$ not equal to the contact angle $\beta$. Bearing assembly 200 can include a first piezoelectric member 208, a second piezoelectric member 212, a third piezoelectric member 214, and a fourth piezoelectric member 216. The four members positioned so that they oppose at least one of the bearing races 202 or 203 around a circumference of at least one of the bearing races 202 or 203. In one embodiment, the four members are relatively positioned so that the first member opposes the bearing race 202 or 203 at approximately a twelve-o'clock position on said circular surface, the second member opposes the first bearing race at approximately a three-o'clock position on said circular surface, the third member opposes the first bearing race at approximately a six-o'clock position on said circular surface, the fourth member opposes the first bearing race at approximately a nine-o'clock position on said circular surface.

In one embodiment, a bearing assembly 400, comprising a shaft member 401 having a first bearing race 402 and a second bearing race 403, a rotor member 404 having a first outer bearing race 405 opposed to the shaft member first bearing race 402 and a second outer bearing race 406 opposed to the shaft member second bearing race 403, an electrically activated member such as piezoelectric member 408 disposed between the shaft member 401 and at least one of the bearing races 402 or 403 for varying the radial position of the at least one bearing race 402 or 403. Bearing assembly 400 can include a first bearing race 402 and first outer bearing race 405 having a contact angle α, and a second bearing race 403 and second outer bearing race 406 having a contact angle β, the contact angle α not equal to the contact angle β. Bearing assembly 400 can include a control system 600 coupled to the at least one piezoelectric member 408 for varying the voltage applied to the at least one piezoelectric member 408. Wherein the controller receives an input signal from the at least one piezoelectric member 408 signifying a vibration of the bearing assembly 400, the control system 600 outputs an output signal to the at least one piezoelectric member 408 dependent on the input signal, the output signal causing the piezoelectric member 408 to damp said vibration.

In one embodiment, a hydrodynamic bearing assembly 800 comprising a pair of relatively moving members 801 and 807 separated by a fluid-filled gap. The hydrodynamic bearing assembly 800 having a stiffness defined by the size of the fluid-filled gap. Hydrodynamic bearing assembly 800 includes an electrically activated means such as piezoelectric member 804 for changing the size of the fluid-filled gap to change the stiffness of the bearing. In one embodiment, the hydrodynamic bearing assembly 800 includes a stator member 801 having a hydrodynamic surface 811, a rotor member 807 having a surface 808 facing the stator member hydrodynamic surface 811, the rotor member surface 808 and the stator member hydrodynamic surface 811 having a gap between them when the rotor surface 808 is moving, and piezoelectric member 804 attached to at least one of the stator member 801 or the rotor member 807 for varying the width of said gap between said surfaces. In one embodiment, a bearing assembly 900, wherein the at least one piezoelectric member 904 is attached to an outer, middle portion of the rotor member 902 so that when the at least one piezoelectric member 904 expands, the rotor member surface 906 facing the stator member hydrodynamic surface 905 bends, and a top portion of the rotor member surface 906 and a bottom portion of the rotor member surface 907 come closer to the stator member hydrodynamic surface 905. In one embodiment, a bearing assembly 1000 wherein the stator member includes a shaft 1001 and the stator member hydrodynamic surface 1007 comprises a radial hydrodynamic surface, the at least one piezoelectric member 1004 disposed within the stator member shaft 1001 so that when the at least one piezoelectric member 1004 expands, the radial hydrodynamic surface 1007 moves closer to the facing rotor member surface 1005. In one embodiment, a bearing assembly 800 wherein the stator member includes a thrust plate 803 and a thrust surface 811 upon the thrust plate 803, a piezoelectric member 804 located within the thrust plate 803 so that when the piezoelectric member 804 expands the thrust surface 811 moves closer to the facing rotor member surface. Bearing assembly 800 can include a control system 600 coupled to the at least one piezoelectric member 804 for varying the voltage applied to the at least one piezoelectric member 804.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A hydrodynamic bearing assembly, comprising:
    a pair of relatively moving members separated by a fluid-filled gap, the hydrodynamic bearing assembly having a stiffness defined by the size of the fluid-filled gap, the pair relatively moving members including a stator member having a hydrodynamic surface and a rotor member having a surface facing the stator member hydrodynamic surface, wherein the stator member includes a thrust plate and the stator member hydrodynamic surface includes at least one thrust surface upon the thrust plate;
    an electrically activated means for changing the size of the fluid-filed gap to change the stiffness of the bearing, the electrically activated means includes at least one piezoelectric member located within the thrust plate so that when the at least one piezoelectric member expands the at least one thrust surface moves closer to the facing rotor member; and
    a control system for receiving a signal signifying a rotational speed of the bearing assembly, wherein the control system sends a signal to the electrically activated means to increase the size of the fluid-filled gap when the rotational speed of the bearing assembly increases.

2. The hydrodynamic bearing assembly according to claim 1, wherein the control system is coupled to the at least one piezoelectric member for varying a voltage applied to the at least one piezoelectric member.

3. The hydrodynamic bearing assembly according to claim 1, wherein the control system is further configured to send a signal to the electrically activated means to decrease the size of the fluid-filled gap when the rotational speed of the bearing assembly decreases.

4. A bearing assembly comprising:
    a pair of relatively moving members;
    an electrically activated member connected to one of the pair of relatively moving members, the electrically activated member situated so that when a voltage is applied to the electrically activated member, the electrically activated member expands to change a physical relationship between the two relatively moving members; and
    a control system coupled to the electrically activated member for varying the voltage applied to the electrically activated member, the control system receives an input signal from the electrically activated member signifying a physical state of the bearing assembly, the control system outputs an output signal to the electrically activated member dependent on the input signal, the output signal causing the electrically activated member to change the physical relationship between the two relatively moving members.

5. The bearing assembly of claim 4, wherein the electrically activated member comprises at least one piezoelectric member.

6. The bearing assembly of claim 4, wherein the physical state of the bearing assembly includes a stiffness of the bearing assembly.

7. The bearing assembly of claim 6, wherein the physical relationship between the pair of relatively moving. members is a size of a fluid-filled gap which is located between the pair of relatively moving members.

8. The bearing assembly of claim 4, wherein the physical state of the bearing assembly includes a rotational speed of the bearing assembly.

9. The bearing assembly of claim 8, wherein the physical relationship between the pair of relatively moving members includes a bearing preload force applied by the pair of relatively moving members against each other.

10. The bearing assembly of claim 4, wherein the physical state of the bearing assembly includes an amount of vibration of the bearing assembly.

11. The bearing assembly of claim 10, wherein the physical relationship between the pair of relatively moving members includes a damping force applied by the pair of relatively moving members against each other.

* * * * *

UNITED STATES PATENT AND TRADEMARK OFFICE
CERTIFICATE OF CORRECTION

PATENT NO.       : 6,505,968 B1
DATED            : January 14, 2003
INVENTOR(S)      : Christian Fleury et al.

It is certified that error appears in the above-identified patent and that said Letters Patent is hereby corrected as shown below:

<u>Title page,</u>
Item [73], Assignee, replace "JPMorgan Chase Bank, New York, NY (US)" with
-- Seagate Technology LLC, Scotts Valley, CA (US) --.

Signed and Sealed this

Eighteenth Day of November, 2003

JAMES E. ROGAN
*Director of the United States Patent and Trademark Office*